United States Patent [19]
Kurahashi

[11] Patent Number: 4,568,088
[45] Date of Patent: Feb. 4, 1986

[54] GOLF CLUB HEAD

[75] Inventor: Kouichiro Kurahashi, Kobe, Japan

[73] Assignee: Sumitomo Rubber Industries, Ltd., Kobe, Japan

[21] Appl. No.: 543,151

[22] Filed: Oct. 18, 1983

[30] Foreign Application Priority Data
Oct. 19, 1982 [JP] Japan .................................. 57-183428

[51] Int. Cl.$^4$ .............................................. A63B 53/04
[52] U.S. Cl. .................................. 273/167 K; 273/169
[58] Field of Search .................... 273/167 F, 169, 170, 273/171, 172, 174, 173, 175, 167 J, 167 K

[56] References Cited
U.S. PATENT DOCUMENTS
2,936,248  5/1960  Marciniak .................... 273/167 F
4,181,306  1/1980  Jepson .......................... 273/173

Primary Examiner—George J. Marlo
Attorney, Agent, or Firm—Birch, Stewart, Kolasch & Birch

[57] ABSTRACT

A golf club head of a wood-type golf club comprising a wooden club head body entirely reinforced by a wood-plastic combination, in which a predetermined thickness of a high density portion is impregnated with plastics at a percentage ranging from 10 to 60% by weight, lies adjacent to a front impact face of the club head, while the remainder portion is lower in density than the high density layer.

4 Claims, 3 Drawing Figures

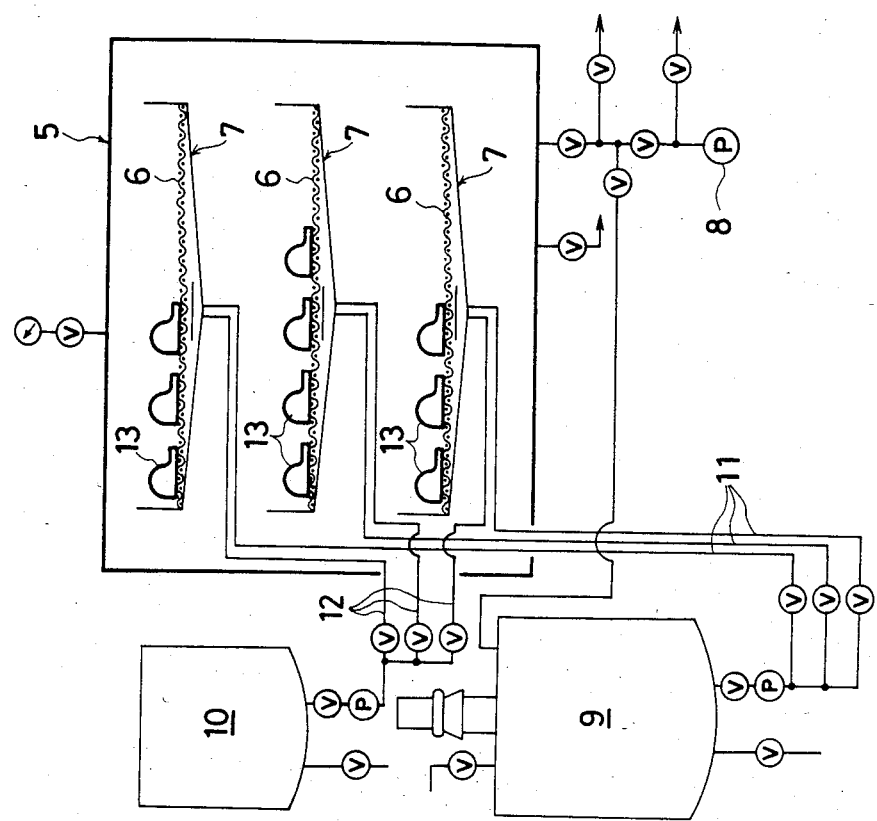
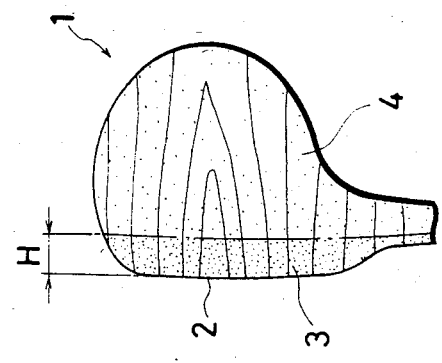

GOLF CLUB HEAD

BACKGROUND AND SUMMARY OF THE INVENTION

This invention relates to a golf club, and more particularly to improvements in a club head structure of a wood-type golf club.

Recently, a so-called two-component type golf ball, which has a spherical elastic core covered with an outer plastic cover, has been widely used among golfers.

As is well-known, the two-component type golf ball is generally of less compressibility (elastic-deformability), and therefore has a smaller contact area, upon impact with a golf club face, as compared with the conventional thread-wound type golf ball which includes a known internal layer formed of wound rubber threads. Accordingly, at the moment when the two-component type ball is hit by the front face of the club head of the golf club, the impact force applied to a local surface spot of the club head face is considerably greater than that in the case of the aforesaid conventional thread-wound type golf ball. Thus, use of the two-component type golf ball has required that a certain reinforcement be added in order to maintain the desired durability of the body of the wooden club head of the wood-type golf club, as will be further described hereinbelow.

The wood-type golf club generally has a club head body formed of a hard wood block such as that of persimmon, and in many cases, a reinforcing insert or face plate, made of ABS resin, vulcanized fibre, light alloy or other suitable durable material, is embedded in and permanently attached, by adhesive or other means to an appropriate recess formed in the center of an impact front face of the body of the wooden club head, in such a manner that the external surface of the embedded face plate lies substantially flush with the wooden front surface area adjacent the embedded face plate, as disclosed, for example, in U.S. Pat. No. 4,181,306 to Jepson.

Thus, so long as a golf ball is correctly hit by the golf club on the embedded face plate, no problem arises. In fact, however, golfers, especially beginners, occasionally hit mis-shots such that the ball is not hit on the face plate but on the incorrect wooden front face area adjacent to the reinforcing face plate. This mis-shot, if the two-component type golf ball is used, results in the formation of an undesirable dent or depression in that portion of the wooden front surface of the golf club head which the golf ball hits. And such mis-shots, if repeated, will finally cause the development of cracks in the wooden club head body.

As will be apparent from the above descrption, the use of the two-component type golf ball has brought about an increase in damage to the wooden club head body and therefore a shorter span of life of the wooden-type golf club.

It is, therefore, a principal object of the present invention to substantially reduce the above-discussed problem with respect to the durability of the wooden club head body of the wood-type golf club.

Another object of the invention is to provide an improved golf club head whose wooden club head body is reinforced by a wood-plastic combination so as to provide a sufficient mechanical strength against impact imparted thereto upon hitting of the two-component type golf ball.

A further object of the invention is to provide an improved golf club head whose wooden club head body is reinforced without losing balance in weight.

Still a further object of the invention is to provide an improved golf club head whose wooden club head body is excellent in dimensional stability, waterproofness, painting efficiency, and glossiness, of the finished surface.

Other objects, features and advantages of the invention will become apparent from the detailed description given hereinafter in connection with the accompanying drawings.

According to the present invention, there is provided a golf club head including a wooden club head body entirely reinforced by a wood-plastic combination. The wooden club head body has a high density layer of a predetermined thickness lying adjcacent to and extending substantially in parallel relationship with the front impact face of the club head. The high density layer is impregnated at a higher percentage with plastic materials, as compared with the remainder portion of the golf club head body.

BRIEF DESCRIPTION OF THE DRAWINGS

In the accompanying drawings:

FIG. 1 is a side elevation view illustrating a wooden club head body embodying the present invention;

FIG. 2 is a diagrammatic chart showing impregnating processes in manufacture of the golf club head according to the present invention.

DESCRIPTION OF THE PREFERRED EMBODIMENTS

Figure 3:
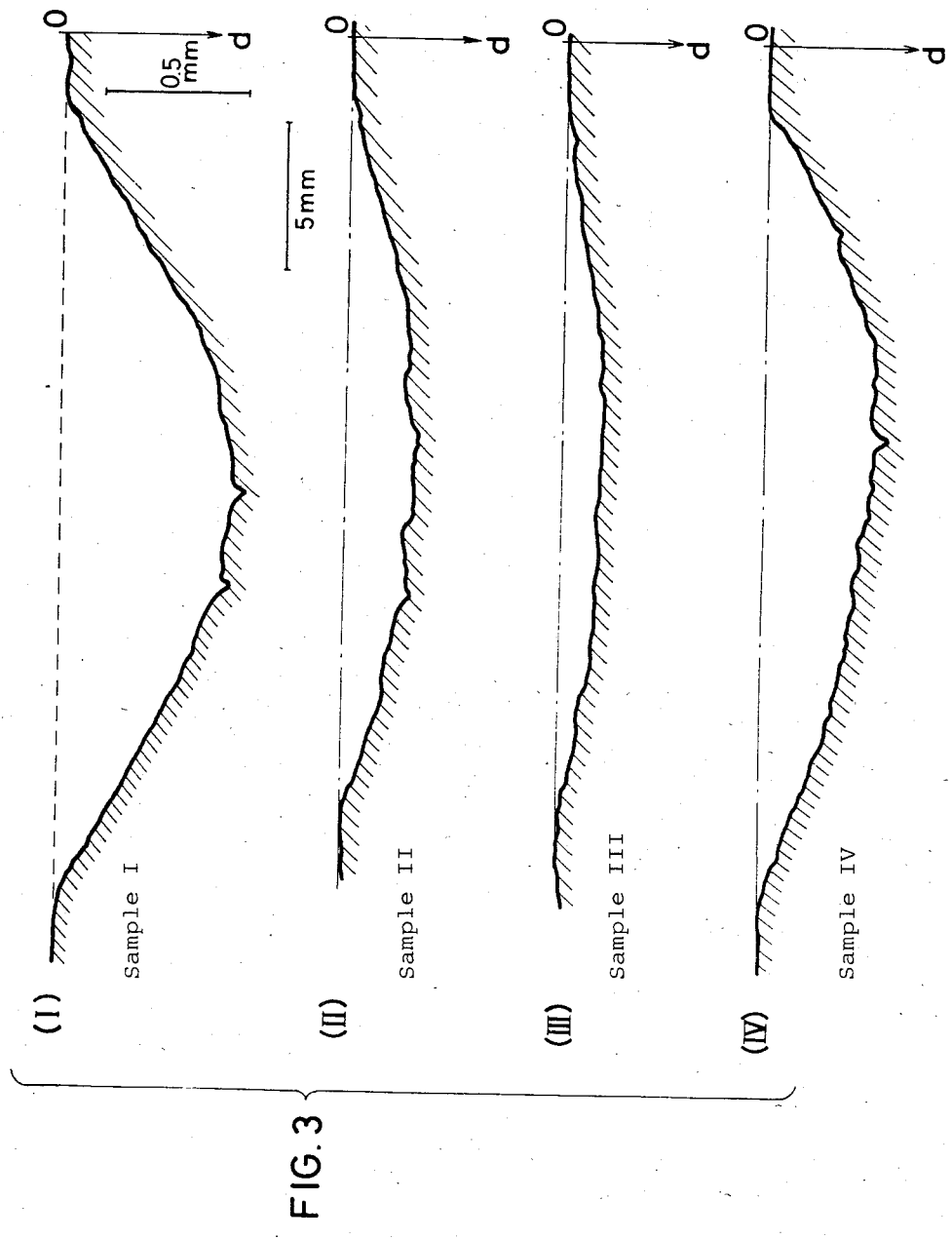
FIG. 3 is a grahic representation showing the different test results with respect to the dimension of a dent formed in a front surface of each of different wooden club head bodies, wherein eac of the abscissa axes indicates a maximum diameter of the formed dent on such a scale as to be enlarged to five times larger than its actual dimension, while each of the ordinate axes indicates a maximum depth of the formed dent on such a scale as is enlarged to fifty times greater than its actual dimension.

Referring now to the accompanying drawings, a golf club head according to the invention is illustrated in FIG. 1 as having a wooden club had body 1 formed of a hard wood block such as for example a wood block of persimmon. The wooden club head body 1 is impregnated with liquid mixture including two or more graft monomers and then heated into graft polymerization with the cellulose in the wood to form a wood-plastic composite, whereby the club head body 1 is reinforced.

The club head body 1 is not uniform in density throughout its entire body but has a particularly high density layer 3, preferably 5 to 15 mm in thickness (H) lying adjacent to and extending substantially in parallel relationship wih the front face 2 of the club head. In FIG. 1, thickness (H) of the layer 3 is illustrated in an exaggerated manner, as compared with its actual dimension, for better clarity.

The layer 3 is impregnated, at a higher percentage than the remainder portion 4 of the club head body 1, with such liquid mixture of graft monomers as capable of providing the desired mechanical strength against impact, for example, mixture of methyl methacrylate, styrene, and polyethylene glycol mono-methacrylate, and then heated into graft polymerization with the cellulose in the wood to form a rigid wood-plastic composite. The remainder portion 4, which is lower in density than the layer 3, is also impregnated, at a lower percentage than the layer 3, with the liquid mixture including at least one high-boiling graft monomer, for example, polypropylene glycol mono-methacrylate, and then heated into graft polymerization with the cellulose in the wood to form a rigid wood-plastic composite.

Thus, the wooden club head body 1 is not only reinforced throughout its entire body by the wood-plastic combination but also provided with a particularly reinforced high density layer 3 which lies adjacent to the front impact face 2 of the club head.

FIG. 2 illustrates a preferred example of the apparatus for carrying out the impregnating process in the manufacture of the wooden golf club head according to the present invention. The apparatus has a decompression chamber 5 of which the internal pressure can be adjustably lowered by means of a known vacuum pump 8 connected thereto. Placed within the decompression chamber 5 are a desired number of open-top impregnating vessels 7 each of which is connected, via conduits 11, 12 each equipped with known valves and pumps, to a first tank 9 and a second tank 10, respectively. Each of the vessels 7 has a sheet of workpiece supporting net 6 or perforated plate placed therein so as to extend horizontally.

The first tank 9, which may be preferably be equiped with a known stirrer or stirrers and a known deairator or deairators (not shown), is filled with a liquid mixture including, for example, 40 parts methyl methacrylate, 40 parts styrene, 20 parts polyethylene glycol mono-methacrylate, and 1 part benzoyl peroxide as a polymerizing catalyst (by weight ratio). Thus, each of the impregnating vessels 7 can be supplied, preferably from its bottom via the conduits 11, with a controlled quantity of the liquid mixture (first mixture) from the first tank 9.

The second tank 10, which also may preferably be equipped with a known stirrer or stirrers and a known deaerator or deaerators (not shown), is filled with liquid mixture including, for example, 95 parts polypropylene glycol mono-methacrylate, 5 parts furfuryl alcohol (serving as impregnation/setting accelerator) and 1 part benzoyl peroxide as polymerizing catalyst (also by weight ratio). Thus, each of the vessels 7 can also be supplied, preferably from its bottom via the conduits 12, with a controlled quantity of the liquid mixture (second mixture) from the second tank (10).

In the manufacture of the golf club head according to the present invention, the impregnating processes may be carried out in the following steps:

First Step: A selected number of wooden head blocks 13 are placed on the workpiece supporting net 6 in each of the vessels 7, with their front faces 2 directed downward, and then the decompression chamber 5 is decompressed by means of the vacuum pump 8 until the internal pressure is lowered to 30 Torr. This condition is maintained for one hour in order to suck out the air contained in the tissue of the wooden head blocks 13.

Second Step: The first liquid mixture in the first tank 9 is fed via the conduits 11 to each of the vessels 7 until the liquid level of the charged mixture rises up to 5 to 15 mm above the horizontal net 6.

Third Step: Each of the wooden head blocks 13 is partially impregnated with the first liquid mixture within the limited range of 5 to 15 mm in thickness (H) above the front face 2 of the block 13, in order to form the high density layer 3. The impregnation is continued for one hour under the pressure of 30 Torr by utilizing capillarity.

Fourth Step: The internal pressure within the chamber 5 is restored to atmospheric level, so that the impregnated liquid mixture is forced to penetrate deep into the tissue of each wooden block 13 by the atmospheric pressure.

Fifth Step: The first liquid mixture in each of the vessels 7 is removed from the vessels 7 and recovered conventionally.

Sixth Step: The second liquid mixture in the second tank (10) is fed via the conduits 12 to each of the vessels 7 until the whole body of each of the blocks 13 is completely immersed in the mixture.

Seventh Step: The impregnation is continued for ten minutes under atmospheric pressure, so that the plastic impregnation degree in the layer 3 is increased up to the range of 10 to 60 weight percent, while that in the remainder portion 4 remains within the range of 3 to 12 weight percent.

Eighth Step: The second mixture in each of the vessels 7 is removed from the vessels and recovered conventionally.

Ninth Step: The wooden head blocks 13 are removed from the chamber 5 and transferred into a suitable known heating chamber or the like (not shown), in which they are heated for ten hours at a temperature of 80° C. causing graft polymerization with the cellulose in the wood to form the desired wood-plastic composite.

Each of the wooden club head bodies thus produced has a high density portion 3 (plastic impregnation degree: 10 to 60 weight percent) and a low density portion 4 (plastic impregnation degree: 3 to 12 weight percent). Since the wooden club head body according to the invention is impregnated with plastics throughout its entire body, it is excellent in waterproofness, painting efficiency and glossiness of the finished surface. Further, the club head body according to the invention is good in dimensional stability because of the wood-plastic combination.

In order to prove the advantages of the club head body according to the invention, comparison tests have been performed by causing 500 impacts by two-component type golf balls shot at an initial velocity of 35 m/sec to the same spot of each front face 2 of four different samples of wooden club head bodies. As a result of the repeated impacts, a dent has been formed in the front face 2 of each of the four samples. Particulars of the employed samples are as follows:

Sample I: a wooden club head body not reinforced by wood-plastic combination
weight: 168.5 g Sample II: a wooden club head body reinforced by wood-plastic combination
weight: 168.5 g before impregnation with plastics
thickness (H) of the high density
layer 3: 10 mm
plastic impregnation degree:
18.2 weight % in the high density layer 3; and
5 weight % in the remainder portiton 4

Sample III: a wooden club head body reinforced by wood-plastic combination
weight: 168.5 g before impregnation with plastics
thickness (H) of the high density
layer 3: 10 mm
plastic impregnation degree:
35.0 weight % in the high density layer 3; and 5 weight % in the remainder portion 4
Sample IV: a wooden club head body reinforced by wood-plastic combination
weight: 168.5 g before impregnation with plastics
thickness (H) of the high density layer 3: 10 mm
plastic impregnation degree:
10.5 weight % in the high density layer 3; and
5 weight % in the remainder portion 4

The obtained test results are graphically shown in FIG. 3, in which Graph I shows the test result with respect to Sample I; Graph II shows that with respect to Sample II; Graph III shows that with respect to Sample III; and Graph IV shows that with respect to Sample IV.

In each of Graphs I to IV, an abscissa axis indicates a maximum diameter of the formed dent on such a scale enlarged to five times its actual dimension, while an ordinate axis indicates a maximum depth (d) of the formed dent on such a scale as enlarged to fifth times larger than its actual dimension. The depth (d) of the formed dent may be measured by a known surface roughness tester.

As is apparent from Graph I, the measured maximum depth (d) of the dent formed in the front face of Sample I (not reinforced) is as large as 0.68 mm. In contrast thereto, that of Sample III (plastic impregnation degree in the layer 3: 35.0 weitht %) is as small as 0.1 mm.

It is also apparent that the measured maximum depth (d) of the formed dent of each of Samples II and IV is smaller than that of the non-reinforced Sample I.

Further, it is also apparent from comparing Graph I with Graphs II and III that the measured maximum diameter of the formed dent of each of the reinforced Samples II and III is smaller than that of the non-reinforced Sample I.

As a result of measurement, it has been found that a value of Brinell hardness of the non-reinforced Sample I remains as low as 6.1, while that of the high density layer 3 of the reinforced Sample III has been increased up to 10.2.

Also, as a result of weight measurement, it has been found that the weight of the reinforced Sample III has been increased from 168.5 g (before impregnation) to 182.2 g (after impregnation). This means that the difference is 13.7 g. However, this difference is not so important from the viewpoint of maintaining a good weight balance in a wood-type golf club. As a result of experiments, it has been found that the difference preferably remians less than 20 g.

If the entire body of the wooden club head is uniformly impregnated with plastics at 35.0% by weight, the total weight of the club head body will be increased from 168.5 g up to about 227.5 g as a result of the following calculation:

$$168.5 \times 1.35 = 227.5$$

This means that the difference is as large as 59 g, which is not permissible from the viewpoint of maintaining a good weight balance in a wood-type golf club.

According to the present invention, however, the problem of the weight balance in a wood-type golf club is eliminated by dividing the wooden club head body into two portions of different density, viz., the high density portion 3 lying adjacent to the front impact face 2 and the low density portion 4 lying adjacent the former.

The present invention being thus described, it will be obvious that same may be varied in many ways. Such variations are not to be regarded as a departure from the spirit and scope of the invention, and all such modifications as would be obvious to those skilled in the art are intended to be included within the scope of the present invention.

I claim:

1. A golf club head having an impact front face comprising
   a wooden club head body entirely reinforced by a wood-plastic combination,
   said club head body including at a predetermined, uniform thickness a uniform high density layer extending substantially parallel to said impact front face thereof,
   said uniform high density layer being impregnated with plastics at a higher percentage than a remainder low density portion of said club head body
   said uniform thickness of said uniform high density layer being within a range from 5 to 15 mm, and
   said uniform high density layer being impregnated with plastics at a percentage ranging from 10 to 60% by weight.

2. The golf club head, as defined in claim 1, wherein said plastics include graft monomers of methyl methacrylate, styrene, and polyethylene glycol monomethacrylate.

3. The golf club head, as defined in claim 1, wherein said remainder portion is impregnated with plastics at a percentage ranging from 3 to 12% by weight.

4. The golf club head, as defined in claim 1, wherein said plastics further include graft monomers of polypropylene glycol mono-methacrylate.

* * * * *